United States Patent
Kohata et al.

(10) Patent No.: US 10,078,369 B2
(45) Date of Patent: Sep. 18, 2018

(54) TACTILE-SENSATION TRANSMITTING DEVICE, TERMINAL DEVICE, AND TACTILE-SENSATION TRANSMITTING METHOD

(71) Applicant: FUJITSU LIMITED, Kawasaki-shi, Kanagawa (JP)

(72) Inventors: Keiji Kohata, Sapporo (JP); Toru Kohei, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 88 days.

(21) Appl. No.: 15/250,795

(22) Filed: Aug. 29, 2016

(65) Prior Publication Data
US 2017/0090575 A1    Mar. 30, 2017

(30) Foreign Application Priority Data
Sep. 30, 2015    (JP) .................. 2015-195301

(51) Int. Cl.
| | | |
|---|---|---|
| G06F 3/01 | (2006.01) | |
| G06F 3/041 | (2006.01) | |
| G06F 3/0488 | (2013.01) | |

(52) U.S. Cl.
CPC ............ G06F 3/016 (2013.01); G06F 3/0416 (2013.01); G06F 3/0488 (2013.01)

(58) Field of Classification Search
CPC ............... G06F 3/016; G06F 2203/014
USPC ................................................. 715/701, 702
See application file for complete search history.

(56) References Cited

U.S. PATENT DOCUMENTS

| | | | | |
|---|---|---|---|---|
| 8,970,534 B2* | 3/2015 | Adachi | ............ | G06F 3/016 310/345 |
| 9,400,556 B2* | 7/2016 | Adachi | ............ | G06F 3/016 |
| 2011/0291976 A1* | 12/2011 | Takada | ............ | G06F 3/016 345/173 |
| 2012/0162114 A1 | 6/2012 | Inoue et al. | | |
| 2012/0194460 A1 | 8/2012 | Kuwabara et al. | | |
| 2014/0104216 A1* | 4/2014 | Adachi | ............ | G06F 3/041 345/173 |

FOREIGN PATENT DOCUMENTS

| | | |
|---|---|---|
| JP | 2011-048698 | 3/2011 |
| JP | 2012-014341 | 1/2012 |

* cited by examiner

*Primary Examiner* — Koosha Sharifi-Tafreshi
(74) *Attorney, Agent, or Firm* — Maschoff Brennan (57) ABSTRACT

A terminal device includes a touch panel and excitation piezoelectric elements. The excitation piezoelectric elements are attached to a touch panel, and generate standing-wave vibration in the touch panel to give a user a tactile sensation when the user has performed a touch operation on the touch panel. The terminal device further includes a pressurization piezoelectric element that is attached to the inner side of the touch panel than the excitation piezoelectric elements, and pressurizes the touch panel thereby changing the vibration mode of the standing-wave vibration including the position of antinodes of the standing-wave vibration.

5 Claims, 11 Drawing Sheets

TACTILE-SENSATION TRANSMITTING DEVICE, TERMINAL DEVICE, AND TACTILE-SENSATION TRANSMITTING METHOD

CROSS-REFERENCE TO RELATED APPLICATION

This application is based upon and claims the benefit of priority of the prior Japanese Patent Application No. 2015-195301, filed on Sep. 30, 2015, the entire contents of which are incorporated herein by reference.

FIELD

The embodiment discussed herein is related to a tactile-sensation transmitting device, a terminal device, and a tactile-sensation transmitting method.

BACKGROUND

Recently, equipment with a touch panel has become widespread. Some touch panels are equipped with a tactile-sensation transmitting device that gives a user a tactile sensation when the user has touched a touch panel by using the squeeze effect of an actuator such as a piezoelectric element which vibrates with applied voltage. The squeeze effect is to generate standing-wave vibration with a ultrasonic frequency of, for example, about 30 KHz on a touch panel, thereby a tactile sensation is given to the user's finger that has touched the touch panel.

[Patent Literature 1] Japanese Laid-open Patent Publication No. 2012-014341
[Patent Literature 2] Japanese Laid-open Patent Publication No. 2011-048698

However, since standing-wave vibration has nodes and antinodes, user's tactile sensation may differ according to which is closer to the touch position of the user's finger in touch with a touch panel, a node or an antinode of the standing-wave vibration. That is, the above-described conventional technology has a problem that user's tactile sensation varies according to the touch position on the touch panel.

As a suggestion, a terminal device detects the position of a user's touch operation performed on a touch panel. Then, the terminal device determines whether the position of the touch operation is within a predetermined distance from the position of some antinode of standing-wave vibration generated on the touch panel by a first actuator attached to the touch panel so as to transmit a tactile sensation from the touch position on the touch panel. If the terminal device has determined that the position of the touch operation is not within the predetermined distance from some antinode of the standing-wave vibration, the terminal device performs the following process. That is, the terminal device changes the position of antinodes of the standing-wave vibration by controlling a second actuator that is attached to the inner side of the touch panel than the first actuator and pressurizes the touch panel.

SUMMARY

According to an aspect of an embodiment, a tactile-sensation transmitting device includes, a touch panel, a first actuator that is attached to the touch panel, and generates standing-wave vibration in the touch panel to transmit a tactile sensation from a touch position on the touch panel, and a second actuator that is attached to the inner side of the touch panel than the first actuator, and pressurizes the touch panel thereby changing the position of antinodes of the standing-wave vibration.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Incidentally, in the embodiment described below, only configurations associated with the technology discussed herein are explained, and description of the other configurations is omitted. Furthermore, in the embodiment described below, description of overlapping configurations or processes that are the same or similar is omitted. Moreover, the technology discussed herein is not limited to the embodiment described below. The embodiment may be appropriately combined with any other embodiment within a range that causes no contradiction. Furthermore, in the embodiment described below, an actuator that applies vibration or pressure to an object is explained as a piezoelectric element that vibrates with applied voltage thereby vibrating the object. However, the technology discussed herein may be applied to any kind of actuator as long as the actuator applies vibration or pressure to an object.

[a] Embodiment

External Appearance of Terminal Device According to Embodiment

Figure 1:
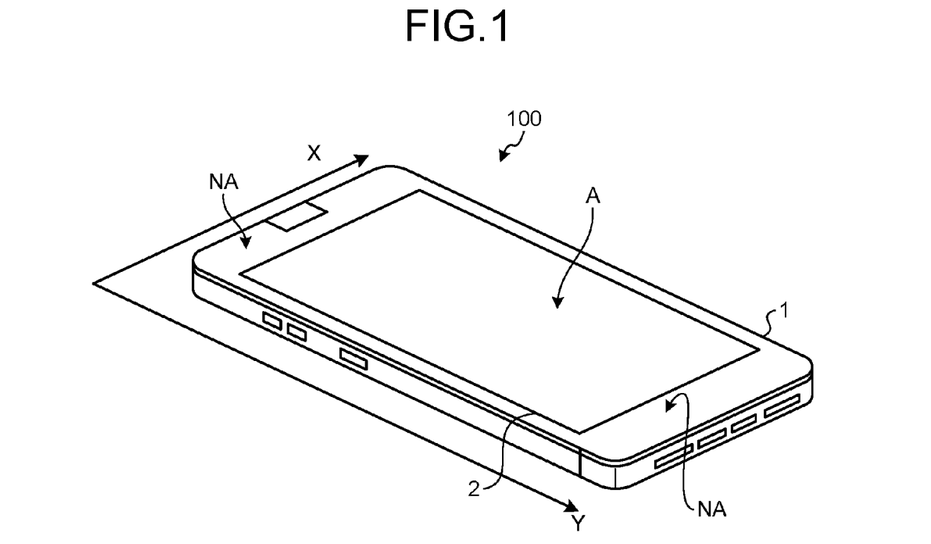
FIG. 1 is a perspective view illustrating an example of the external appearance of a terminal device according to an embodiment.

FIG. 1 is a perspective view illustrating an example of the external appearance of the terminal device according to the embodiment. As illustrated in FIG. 1, a terminal device 100 according to the embodiment is, for example, a smartphone with a touch panel 2 on one of the principal surfaces of a slate-like case 1 thereof. In the embodiment described below, as illustrated in FIG. 1, there is used an X-Y coordinate system where the axis along the short side of the terminal device 100 is denoted by the X axis, and the axis along the long side of the terminal device 100 approximately perpendicular to the X axis is denoted by the Y axis. Furthermore, as illustrated in FIG. 1, of the area of the touch panel 2 mounted on the principal surface of the terminal device 100, an area available for touch operation is referred to as an active area A, and an area other than the active area A is referred to as a non-active area NA. Areas of the touch panel 2 from 0 mm to 20 mm and from 120 mm to 140 mm in the Y-axis direction are non-active areas NA, and an area of the touch panel 2 from 20 mm to 120 mm in the Y-axis direction is an active area A.

Figure 2:
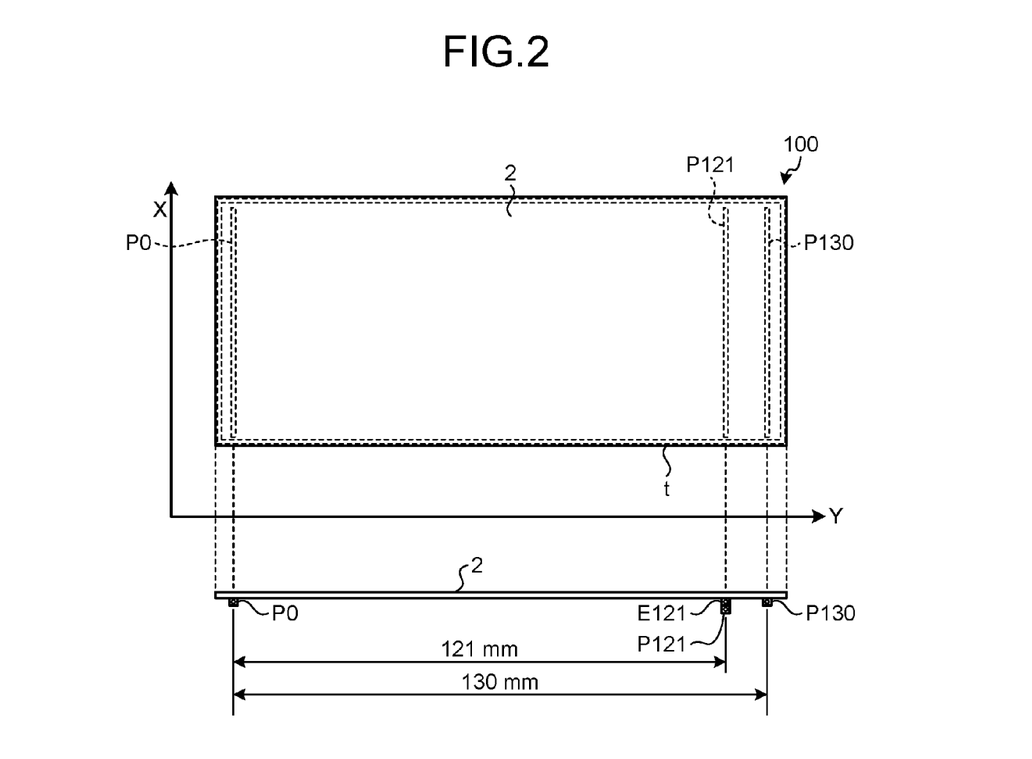
FIG. 2 is a diagram illustrating a first arrangement example of piezoelectric elements in the terminal device according to the embodiment.

First Arrangement Example of Piezoelectric Elements in Terminal Device According to Embodiment FIG. 2 is a diagram illustrating a first arrangement example of piezoelectric elements in the terminal device according to the embodiment. As illustrated in FIG. 2, the terminal device 100 includes the touch panel 2 that is an object on which the squeeze effect of giving a pseudo tactile sensation, such as a smooth or rough tactile sensation, is to be exerted. Furthermore, the terminal device 100 includes long excitation piezoelectric elements P0 and P130 that are attached to the back surface of the touch panel 2 approximately along the both short sides of the touch panel 2 in the X-axis direction, respectively. Moreover, the terminal device 100 includes a long pressurization piezoelectric element P121 that is attached to the back surface of the touch panel 2 along the X-axis direction so as to be approximately parallel to the excitation piezoelectric elements P0 and P130 on the inner side of the touch panel 2 in the Y-axis direction than the excitation piezoelectric elements P0 and P130. A member for mounting the touch panel 2 on the terminal device 100, such as a double-sided adhesive tape t, is attached to the periphery of the touch panel 2.

The excitation piezoelectric elements P0 and P130 are attached to the back surface of the touch panel 2 by an attaching member such as double-sided adhesive tape. When the Y-coordinate of the excitation piezoelectric element P0 attached to the touch panel 2 is set as 0, the excitation piezoelectric element P130 is attached to the position of the touch panel 2 where is at a distance of, for example, 130 mm from the excitation piezoelectric element P0 in a direction of the Y-coordinate. The excitation piezoelectric elements P0 and P130 have stretching vibration in a normal direction, i.e., an out-of-plane direction of the touch panel 2 with applied voltage and apply pressure force to the touch panel 2, thereby generating standing-wave vibration on the touch panel 2.

The drive frequency of the excitation piezoelectric elements P0 and P130 is, for example, 30 KHz. The standing-wave vibration generated on the touch panel 2 by the excitation piezoelectric elements P0 and P130 is vibration that gives a certain tactile sensation to the user's finger that has touched the touch panel 2. The standing-wave vibration generated on the touch panel 2 by the excitation piezoelectric elements P0 and P130 is referred to as fundamental vibration.

The pressurization piezoelectric element P121 is attached to the back surface of the touch panel 2 by an attaching member such as double-sided adhesive tape through an elastic body E121 inserted between the pressurization piezoelectric element P121 and the touch panel 2. When the Y-coordinate of the excitation piezoelectric element P0 attached to the touch panel 2 is set as 0, the pressurization piezoelectric element P121 is attached to the position of the touch panel 2 where is at a distance of, for example, 121 mm from the excitation piezoelectric element P0 in the direction of the Y-coordinate. Furthermore, the pressurization piezoelectric element P121 is arranged in an area corresponding to a non-node part of the fundamental vibration in the Y-axis direction. The pressurization piezoelectric element P121 generates predetermined pressurization or vibration that gives the pressurization in the touch panel 2 with applied voltage, thereby changing the vibration mode of the fundamental vibration generated by the excitation piezoelectric elements P0 and P130. The vibration modes include at least the node position and antinode position of the fundamental vibration, respectively. The vibration that the pressurization piezoelectric element P121 gives the touch panel 2 the pressurization is referred to as pressurization vibration. Furthermore, the vibration to which the vibration mode of the fundamental vibration has been changed by the pressurization and the pressurization vibration is referred to as controlled vibration.

The drive frequency for vibrating the pressurization piezoelectric element P121 is, for example, 30 KHz. The pressurization piezoelectric element P121 is attached to the bottom of the elastic body E121 that is in direct contact with the touch panel 2 so that the pressurization piezoelectric element P121 gives pressurization to the elastic body E121. Therefore, for example, even if the pressurization piezoelectric element P121 has the same material and the same drive frequency as the excitation piezoelectric elements P0 and P130, the amplitude of the pressurization vibration given to the touch panel 2 is different from the amplitude of the stretching vibration of the excitation piezoelectric elements P0 and P130.

Block of Terminal Device According to Embodiment

Figure 3:
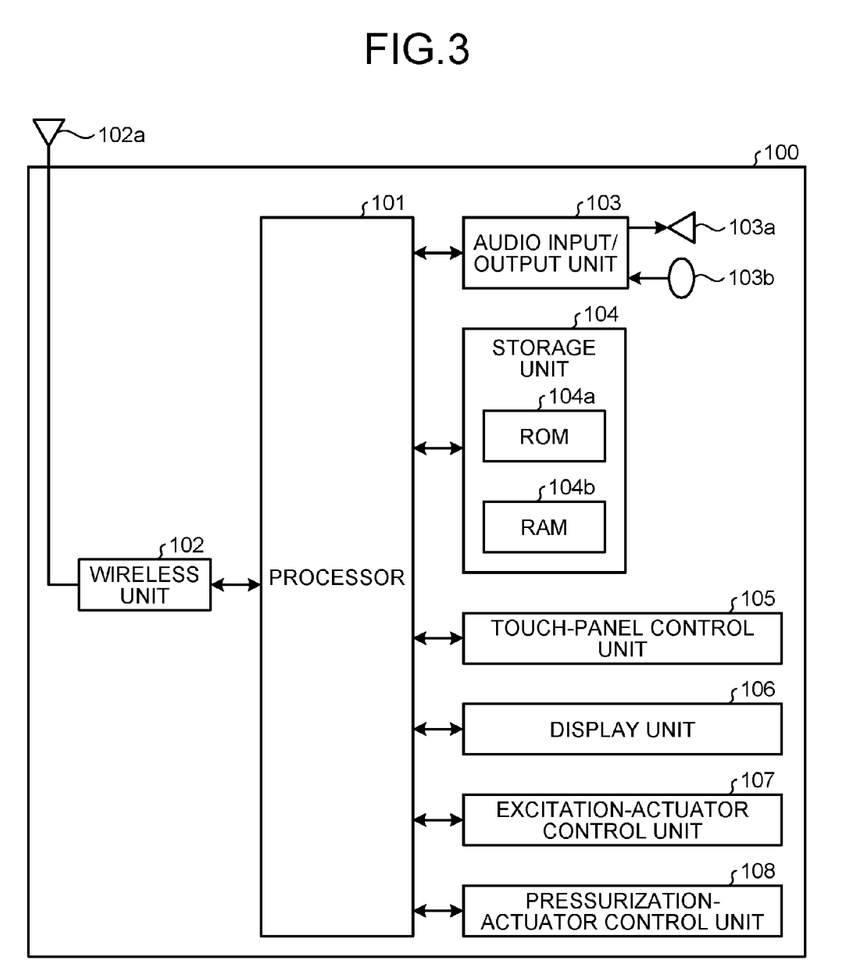
FIG. 3 is a block diagram illustrating an example of the terminal device according to the embodiment.

FIG. 3 is a block diagram illustrating an example of the terminal device according to the embodiment. As illustrated in FIG. 3, the terminal device 100 includes a processor 101, a wireless unit 102, an audio input/output unit 103, a storage unit 104, a touch-panel control unit 105, a display unit 106, an excitation-actuator control unit 107, and a pressurization-actuator control unit 108.

The processor 101 is an integrated circuit, such as a system-on-chip (SoC), that controls the entire terminal device 100 including the above-mentioned units and performs communication processing performed by the terminal device 100 and various processes including a piezoelectric-element control process according to the embodiment. For example, the processor 101 determines whether the distance between the position of an antinode of fundamental vibration and the touch position of the finger on the touch panel 2 is within a predetermined distance, such as 2 mm, in the direction of the Y-coordinate of the X-Y coordinate system. Furthermore, the processor 101 selects controlled vibration bringing an antinode to the touch position of the finger on the touch panel 2. Moreover, the processor 101 controls the pressurization piezoelectric element P121 and causes the pressurization piezoelectric element P121 to generate controlled vibration to which the vibration mode of the fundamental vibration on the touch panel 2 has been changed. The wireless unit 102 modulates a baseband signal from the processor 101 into a wireless signal, and transmits the wireless signal via an antenna 102a. Furthermore, the wireless unit 102 demodulates a wireless signal received via the antenna 102a and generates a baseband signal, and outputs the baseband signal to the processor 101.

The audio input/output unit 103 decodes an audio signal from the processor 101, and outputs audio from a speaker 103a. Furthermore, the audio input/output unit 103 outputs an audio signal that audio input from a microphone 103b has been encoded to the processor 101. The storage unit 104 includes a read-only memory (ROM) 104a and a random access memory (RAM) 104b; the ROM 104a stores therein the programs and data for the processor 101 performing processes, and the RAM 104b is a temporary storage area used when the processor 101 performs a process.

The ROM 104a stores therein antinode position information on the touch panel 2 about the positions of antinodes of the fundamental vibration generated on the touch panel 2 by the excitation piezoelectric elements P0 and P130. Furthermore, the ROM 104a stores therein position information of antinodes of the controlled vibration. The antinode position information is, for example, coordinate information on the X-Y coordinate system. The respective pieces of antinode position information of the fundamental vibration and the controlled vibration may be stored in another external storage device instead of the ROM 104a.

The touch-panel control unit 105 detects a touch on the touch panel 2, and outputs coordinate information that identifies the touch position to the processor 101. The display unit 106 is a display device placed beneath the touch panel 2 of the terminal device 100, and displays thereon display information so that a user views the display information through the touch panel 2.

The excitation-actuator control unit 107 controls the excitation piezoelectric elements P0 and P130. In response to an instruction to start applying voltage from the processor 101, the excitation-actuator control unit 107 applies a predetermined voltage to the excitation piezoelectric elements P0 and P130 so as to drive the excitation piezoelectric elements P0 and P130, for example, at a frequency of 30 KHz. Furthermore, in response to an instruction to stop applying voltage from the processor 101, the excitation-actuator control unit 107 stops applying the voltage to the excitation piezoelectric elements P0 and P130.

The pressurization-actuator control unit 108 controls the pressurization piezoelectric element P121. In response to an instruction to start applying voltage from the processor 101, the pressurization-actuator control unit 108 applies a predetermined voltage to the pressurization piezoelectric element P121 so as to drive the pressurization piezoelectric element P121, for example, at a predetermined pressure or a frequency of 30 KHz. Furthermore, in response to an instruction to stop applying voltage from the processor 101, the pressurization-actuator control unit 108 stops applying the voltage to the pressurization piezoelectric element P121.

Piezoelectric-Element Control Process According to Embodiment

Figure 4:
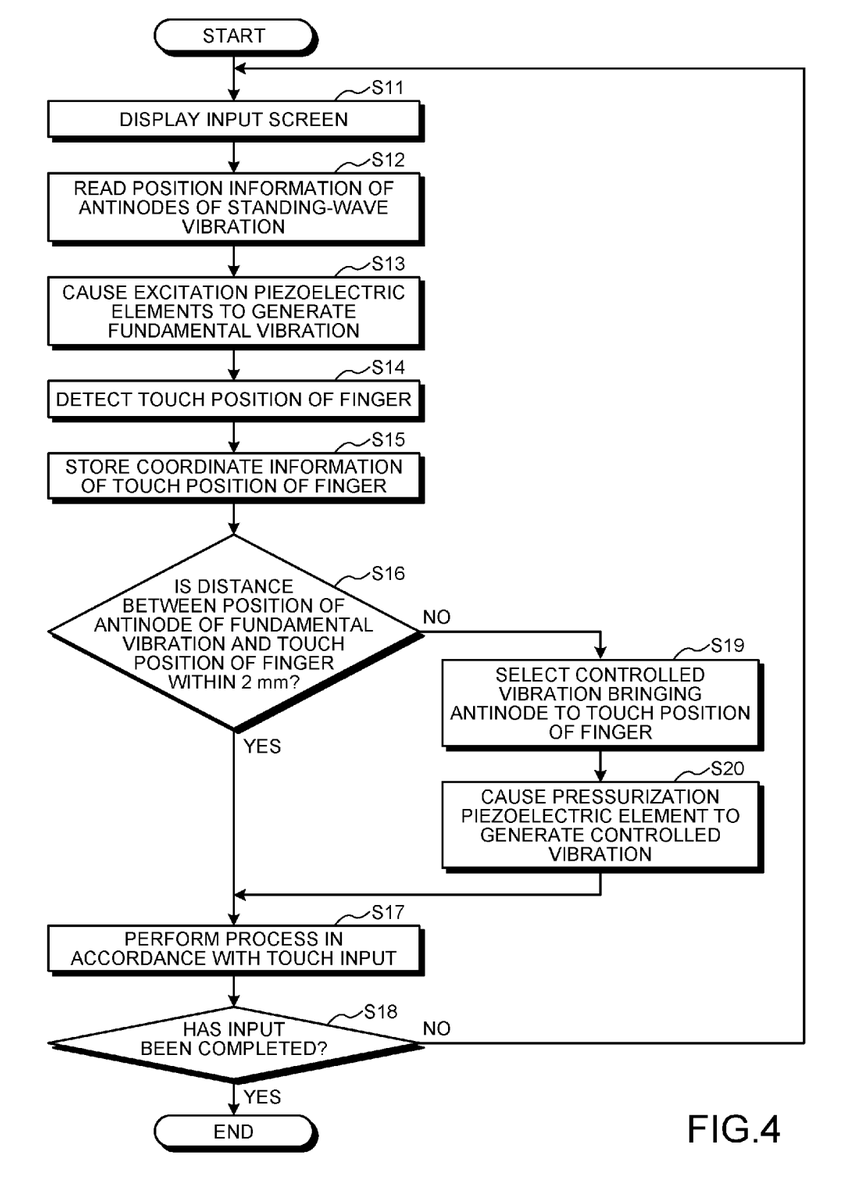
FIG. 4 is a flowchart illustrating an example of a piezoelectric-element control process in the terminal device according to the embodiment.

FIG. 4 is a flowchart illustrating an example of a piezoelectric-element control process in the terminal device according to the embodiment. First, the terminal device 100 displays an input screen on the display unit 106 in response to a touch operation (Step S11). Then, the terminal device 100 reads position information of antinodes of standing-wave vibration from the ROM 104a (Step S12). Then, the terminal device 100 controls the excitation piezoelectric elements P0 and P130 and causes them to generate fundamental vibration on the touch panel 2 (Step S13).

Then, in response to a touch operation on the touch panel 2, the terminal device 100 detects the touch position of the user's finger (Step S14). Then, the terminal device 100 stores coordinate information of the touch position of the user's finger detected at Step S14 (Step S15). Then, the terminal device 100 determines whether the distance between the position of an antinode of the fundamental vibration and the touch position of the finger stored at Step S15 is within a predetermined distance, such as 2 mm, in the direction of the Y-coordinate of the X-Y coordinate system (Step S16). If the distance between the position of an antinode of the fundamental vibration and the touch position of the finger is within the predetermined distance in the direction of the Y-coordinate of the X-Y coordinate system (YES at Step S16), the terminal device 100 moves on to Step S17. On the other hand, if the distance between the position of an antinode of the fundamental vibration and the touch position of the finger is not within the predetermined distance in the direction of the Y-coordinate of the X-Y coordinate system (NO at Step S16), the terminal device 100 moves on to Step S19.

The terminal device 100 performs a predetermined process in accordance with a touch input to a portion of the input display screen displayed at Step S11 according to the touch position of the finger stored at Step S15 (Step S17). After having performed the predetermined process, the terminal device 100 determines whether the input to the input screen displayed at Step S11 has been completed (Step S18). If the input to the input screen displayed at Step S11 has been completed (YES at Step S18), the terminal device 100 ends the piezoelectric-element control process; if the input to the input screen displayed at Step S11 has not been completed (NO at Step S18), the terminal device 100 moves on to Step S11.

On the other hand, the terminal device 100 selects controlled vibration bringing an antinode to the touch position of the finger stored at Step S15 (Step S19). Then, the terminal device 100 controls the pressurization piezoelectric element P121 and causes the pressurization piezoelectric element P121 to generate controlled vibration to which the vibration mode of the fundamental vibration on the touch panel 2 has been changed (Step S20). Then, when having finished the process at Step S20, the terminal device 100 moves on to Step S17.

Fundamental Vibration According to Embodiment

Figure 5:
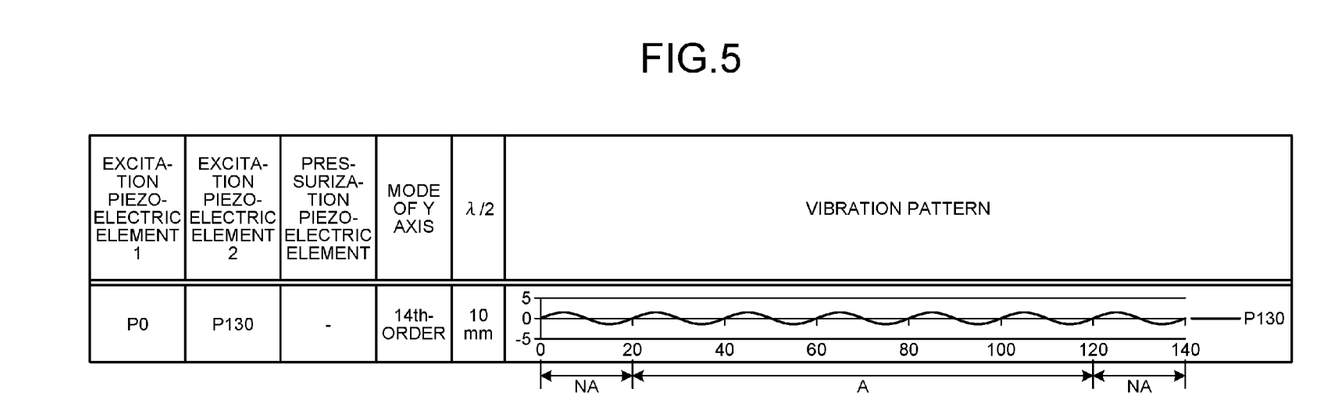
FIG. 5 is a diagram illustrating an example of fundamental vibration of a touch panel in the terminal device according to the embodiment.

FIG. 5 is a diagram illustrating an example of fundamental vibration of the touch panel in the terminal device according to the embodiment. The fundamental vibration is standing-wave vibration generated in the touch panel 2 by driving only the excitation piezoelectric elements P0 and P130 without driving the pressurization piezoelectric element P121. FIG. 5 illustrates a state of the maximum amplitude of standing-wave vibration at a certain point of time. As illustrated in FIG. 5, the vibration pattern of the fundamental vibration is a fourteenth-order vibration in the Y-axis direction of the touch panel 2. Furthermore, when the wavelength of the fundamental vibration is denoted by $\lambda$, $\lambda/2$ is about 10 mm.

First Controlled Vibration of Touch Panel According to Embodiment

Figure 6:
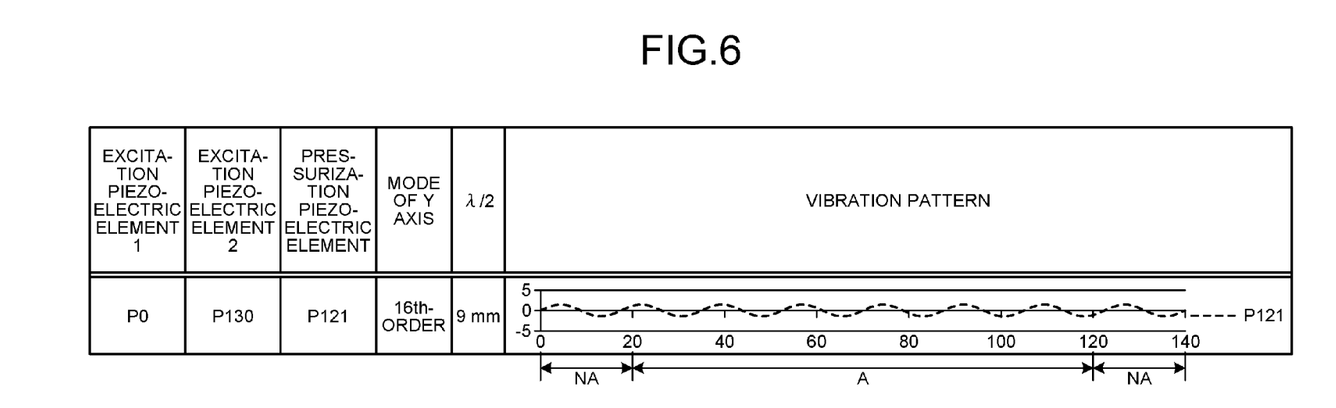
FIG. 6 is a diagram illustrating an example of first controlled vibration of the touch panel in the terminal device according to the embodiment.

FIG. 6 is a diagram illustrating an example of first controlled vibration of the touch panel in the terminal device according to the embodiment. The first controlled vibration is standing-wave vibration when the touch panel 2 is provided with the excitation piezoelectric elements P0 and P130 and the pressurization piezoelectric element P121. As illustrated in FIG. 6, the vibration pattern of the first controlled vibration is sixteenth-order vibration in the Y-axis direction of the touch panel 2. Furthermore, when the wavelength of the first controlled vibration is denoted by $\lambda$, $\lambda/2$ is about 9 mm. Like this, the first controlled vibration has a different length between adjacent nodes from the length between adjacent nodes of the fundamental vibration, so antinodes appear at the different position from those in the fundamental vibration.

Figure 7A:
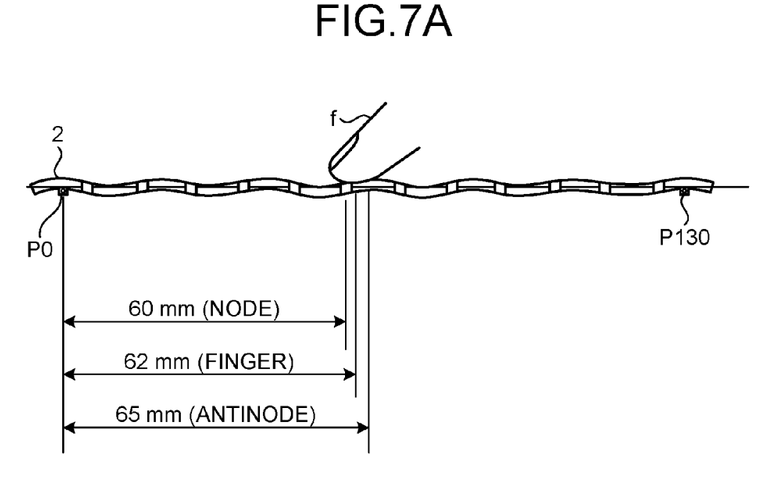
FIG. 7A is a diagram illustrating an example of a relationship between vibration of the touch panel and the finger position on the touch panel in the terminal device according to the embodiment.
Figure 7B:
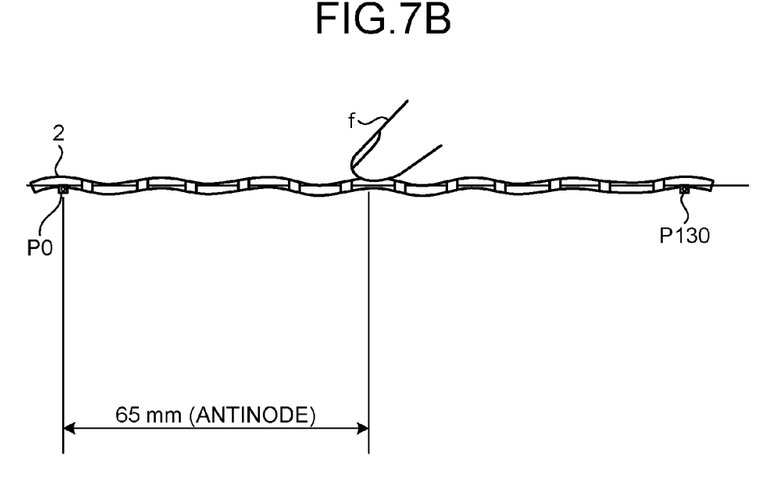
FIG. 7B is a diagram illustrating another example of a relationship between vibration of the touch panel and the finger position on the touch panel in the terminal device according to the embodiment.

Relationship Between Vibration of Touch Panel and Finger Position According to Embodiment FIGS. 7A and 7B are diagrams illustrating an example of a relationship between vibration of the touch panel and the finger position on the touch panel in the terminal device according to the embodiment. For example, when thirteenth-order vibration is used by use of the touch panel 2 with a length in the Y-axis direction of, for example, about 140 mm, one wavelength $\lambda$ of standing-wave vibration is about 21.5 mm. Since the average width of a human finger touch on the touch panel 2 is about 7 mm, the magnitude of a tactile sensation felt by the finger varies according to which position in one wavelength the finger has touched, i.e., according to whether the finger has touched near a node or near an antinode. That is, when the finger has touched near an antinode of standing-wave vibration, the finger feels a greater tactile sensation than when the finger has touched near a node of standing-wave vibration.

Assume that, as illustrated in FIG. 7A, a finger f has touched a position of about 62 mm in the Y-axis direction on the touch panel 2, which is between the position of a node of standing-wave vibration located at about 60 mm in the Y-axis direction and the position of an antinode of the standing-wave vibration located at about 65 mm in the Y-axis direction. The touch point where the finger f has touched is not an antinode part where the amplitude of the standing-wave vibration reaches the maximum, so an obtained tactile sensation is relatively small. On the other hand, as illustrated in FIG. 7B, if the finger f has touched a portion of the touch panel 2 corresponding to the position of the antinode of the standing-wave vibration located at about 65 mm in the Y-axis direction, since the touch point is a part where the amplitude of the standing-wave vibration reaches the maximum, an obtained tactile sensation is the greatest. Incidentally, in a case where standing-wave vibration is fourteenth-order vibration, the difference is only in that one wavelength $\lambda$ of the standing-wave vibration is longer, and the other is the same.

That is, even when a sufficient tactile sensation is not able to be given to the finger in touch with the touch panel 2 at a position of some node of fundamental vibration, the vibration mode is changed by the first controlled vibration, thereby bringing the position of an antinode of the first controlled vibration close to the finger in touch with the touch panel 2; thus it is possible to give the finger an approximately uniform tactile sensation regardless of the touch position and reduce the variation in user's tactile sensation according to the touch position on the touch panel.

Figure 8:
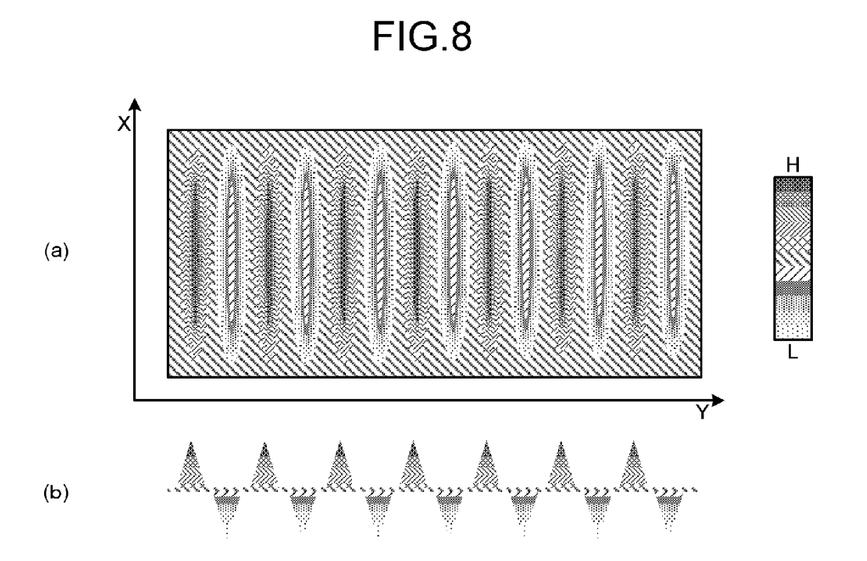
FIG. 8 is a diagram illustrating the distribution of vibration displacement of the touch panel in the terminal device according to the embodiment.

Distribution of Vibration Displacement of Touch Panel in Terminal Device According to Embodiment FIG. 8 is a diagram illustrating the distribution of vibration displacement of the touch panel in the terminal device according to the embodiment. FIG. 8 illustrates a case where standing-wave vibration is fourteenth-order vibration. In FIG. 8, (a) illustrates the distribution of vibration displacement of standing-wave vibration of the touch panel 2 in an X-Y plane view, and (b) illustrates the distribution of vibration displacement of the standing-wave vibration of the touch panel 2 viewed from the lateral side of the X-Y plane. As illustrated in (a) and (b) of FIG. 8, fourteen peaks of vibration displacement in the Y-axis direction appear in the fourteenth-order standing-wave vibration. That is, as it is seen from (b) in FIG. 8, seven peaks and seven troughs in the Y-axis direction appear in the fourteenth-order standing-wave vibration. Each peaks of vibration displacement represents when a given antinode of the standing-wave vibration has reached the peak. As illustrated in (a) of FIG. 8, with increasing distance from each peak of vibration displacement towards the periphery of the touch panel 2 as if surrounding the peak, the amount of vibration displacement lessens gradually. That is, in a vibration displacement distribution state of the touch panel 2 illustrated in (a) of FIG. 8, a sufficient tactile sensation is obtained when a portion near each peak has been touched with the finger; however, with increasing distance from the portion near each peak, a sufficient tactile sensation becomes less able to be obtained. Therefore, it is seen that when the finger in touch with the touch panel 2 is located on a node of fundamental vibration, a sufficient tactile sensation is provided by changing the vibration mode by using first controlled vibration, thereby bringing the position of an antinode of the first controlled vibration close to the position of the finger in touch with the touch panel 2.

Figure 9:
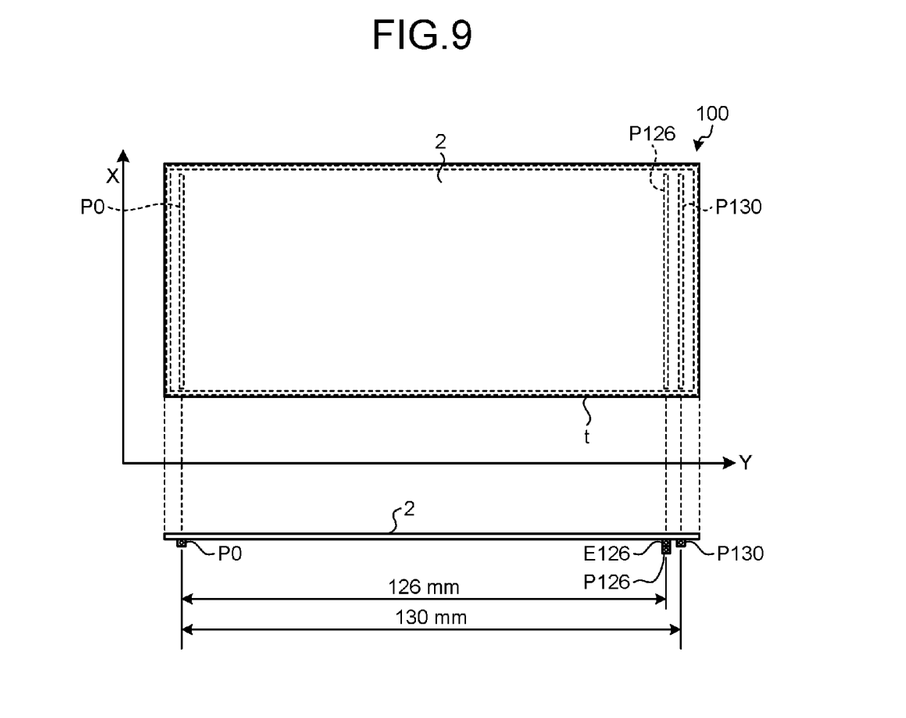
FIG. 9 is a diagram illustrating a second arrangement example of piezoelectric elements in the terminal device according to the embodiment.

Second Arrangement Example of Piezoelectric Elements in Terminal Device According to Embodiment FIG. 9 is a diagram illustrating a second arrangement example of piezoelectric elements in the terminal device according to the embodiment. In description of the second arrangement example of piezoelectric elements, only a different part from the first arrangement example of piezoelectric elements is described. As illustrated in FIG. 9, the terminal device 100 includes a pressurization piezoelectric element P126 instead of the pressurization piezoelectric element P121 illustrated in FIG. 2. The pressurization piezoelectric element P126 is a long element that is attached to the back surface of the touch panel 2 along the X-axis direction so as to be approximately parallel to the excitation piezoelectric elements P0 and P130 on the inner side of the touch panel 2 in the Y-axis direction than the excitation piezoelectric elements P0 and P130.

The pressurization piezoelectric element P126 is attached to the back surface of the touch panel 2 by an attaching member such as double-sided adhesive tape through an elastic body E126 inserted between the pressurization piezoelectric element P126 and the touch panel 2. When the Y-coordinate of the excitation piezoelectric element P0 attached to the touch panel 2 is set as 0, the pressurization piezoelectric element P126 is attached to the position of the touch panel 2 where is at a distance of, for example, 126 mm from the excitation piezoelectric element P0 in the direction of the Y-coordinate. Furthermore, the pressurization piezoelectric element P126 is arranged in an area corresponding to a non-node part of the fundamental vibration in the Y-axis direction. The pressurization piezoelectric element P126 generates predetermined pressurization or vibration that gives the pressurization in the touch panel 2 with applied voltage, thereby changing the vibration mode of the fundamental vibration generated by the excitation piezoelectric elements P0 and P130.

The drive frequency for vibrating the pressurization piezoelectric element P126 is, for example, 30 KHz. The pressurization piezoelectric element P126 is attached to the bottom of the elastic body E126 that is in direct contact with the touch panel 2 so that the pressurization piezoelectric element P126 gives pressurization to the elastic body E126. Therefore, for example, even if the pressurization piezoelectric element P126 has the same material and the same drive frequency as the excitation piezoelectric elements P0 and P130, the amplitude of the pressurization vibration given to the touch panel 2 is different from the amplitude of the stretching vibration of the excitation piezoelectric elements P0 and P130. Incidentally, a piezoelectric-element control process using the pressurization piezoelectric element P126 is the same as the piezoelectric-element control process using the pressurization piezoelectric element P121.

Second Controlled Vibration of Touch Panel According to Embodiment

Figure 10:
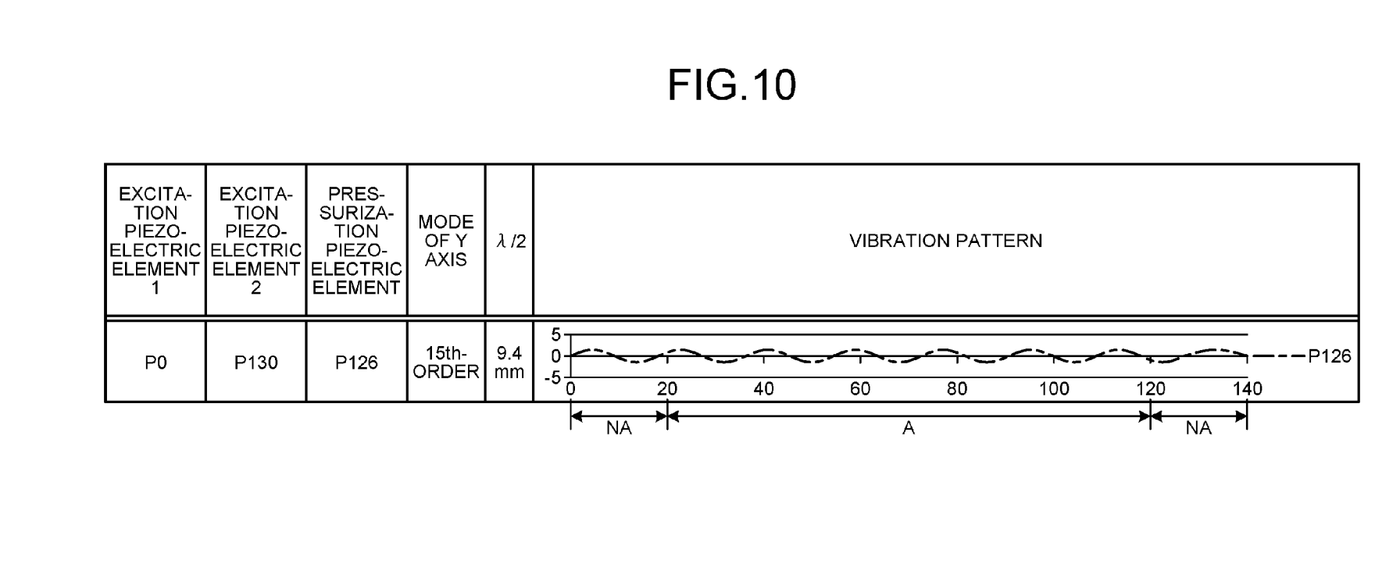
FIG. 10 is a diagram illustrating an example of second controlled vibration of the touch panel in the terminal device according to the embodiment.

FIG. 10 is a diagram illustrating an example of second controlled vibration of the touch panel in the terminal device according to the embodiment. The second controlled vibration is standing-wave vibration when the touch panel 2 is provided with the excitation piezoelectric elements P0 and P130 and the pressurization piezoelectric element P126. As illustrated in FIG. 10, the vibration pattern of the second controlled vibration is fifteenth-order vibration in the Y-axis direction of the touch panel 2. Furthermore, when the wavelength of the second controlled vibration is denoted by λ, λ/2 is about 9.4 mm. Like this, the second controlled vibration has a different length between adjacent nodes from the length between adjacent nodes of the fundamental vibration, so antinodes appear at the different position from those in the fundamental vibration.

Figure 11:
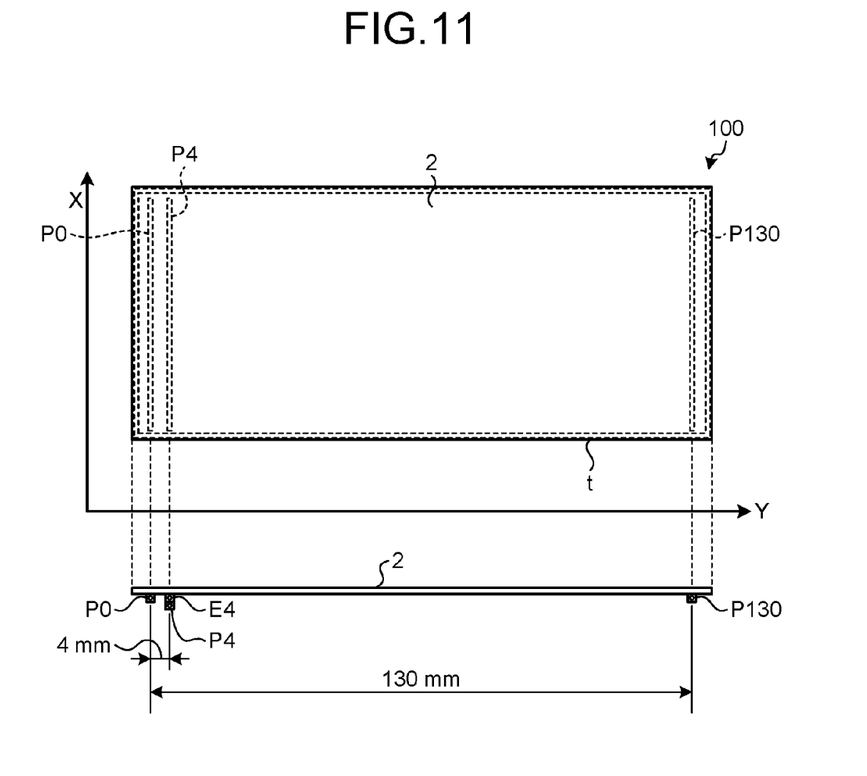
FIG. 11 is a diagram illustrating a third arrangement example of piezoelectric elements in the terminal device according to the embodiment.

Third Arrangement Example of Piezoelectric Elements in Terminal Device According to Embodiment FIG. 11 is a diagram illustrating a third arrangement example of piezoelectric elements in the terminal device according to the embodiment. In description of the third arrangement example of piezoelectric elements, only a different part from the first arrangement example of piezoelectric elements is described. As illustrated in FIG. 11, the terminal device 100 includes a pressurization piezoelectric element P4 instead of the pressurization piezoelectric element 121 illustrated in FIG. 2. The pressurization piezoelectric element P4 is a long element that is attached to the back surface of the touch panel 2 along the X-axis direction so as to be approximately parallel to the excitation piezoelectric elements P0 and P130 on the inner side of the touch panel 2 in the Y-axis direction than the excitation piezoelectric elements P0 and P130.

The pressurization piezoelectric element P4 is attached to the back surface of the touch panel 2 by an attaching member such as double-sided adhesive tape through an elastic body E4 inserted between the pressurization piezoelectric element P4 and the touch panel 2. When the Y-coordinate of the excitation piezoelectric element P0 attached to the touch panel 2 is set as 0, the pressurization piezoelectric element P4 is attached to the position of the touch panel 2 where is at a distance of, for example, 4 mm from the excitation piezoelectric element P0 in the direction of the Y-coordinate. Furthermore, the pressurization piezoelectric element P4 is arranged in an area corresponding to a non-node part of the fundamental vibration in the Y-axis direction. The pressurization piezoelectric element P4 generates predetermined pressurization or vibration that gives the pressurization in the touch panel 2 with applied voltage, thereby changing the vibration mode of the fundamental vibration generated by the excitation piezoelectric elements P0 and P130. Incidentally, a piezoelectric-element control process using the pressurization piezoelectric element P4 is the same as the piezoelectric-element control process using the pressurization piezoelectric element P121.

Third Controlled Vibration of Touch Panel According to Embodiment

Figure 12:
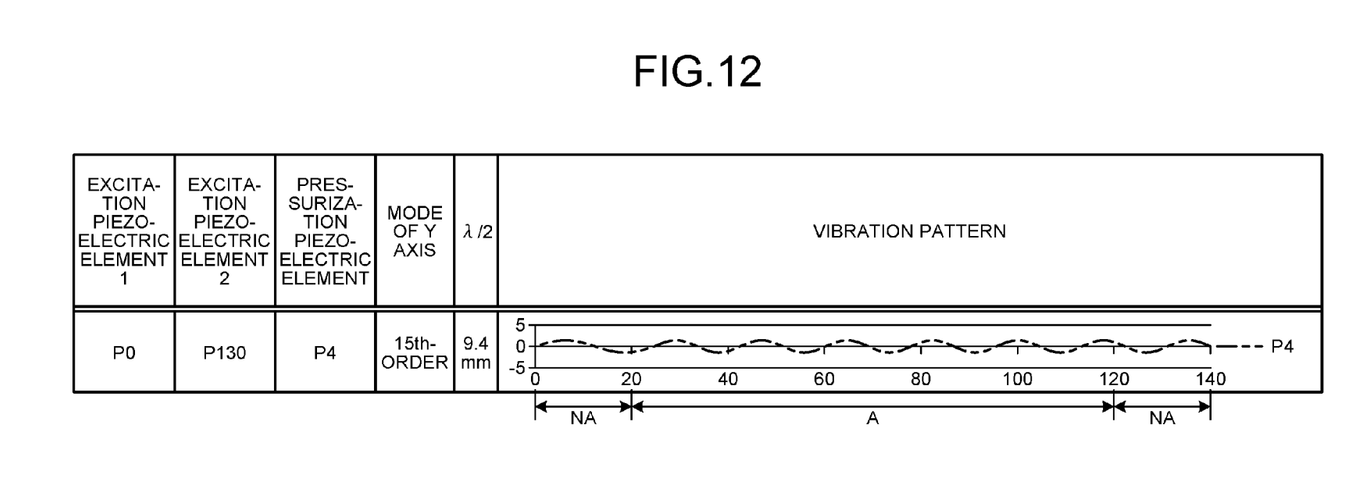
FIG. 12 is a diagram illustrating an example of third controlled vibration of the touch panel in the terminal device according to the embodiment.

FIG. 12 is a diagram illustrating an example of third controlled vibration of the touch panel in the terminal device according to the embodiment. The third controlled vibration is standing-wave vibration when the touch panel 2 is provided with the excitation piezoelectric elements P0 and P130 and the pressurization piezoelectric element P4. As illustrated in FIG. 12, the vibration pattern of the third controlled vibration is fifteenth-order vibration in the Y-axis direction of the touch panel 2. Furthermore, when the wavelength of the third controlled vibration is denoted by λ, λ/2 is about 9.4 mm. Like this, the third controlled vibration has a different length between adjacent nodes from the length between adjacent nodes of the fundamental vibration, so antinodes appear at the different position from those in the fundamental vibration.

Figure 13:
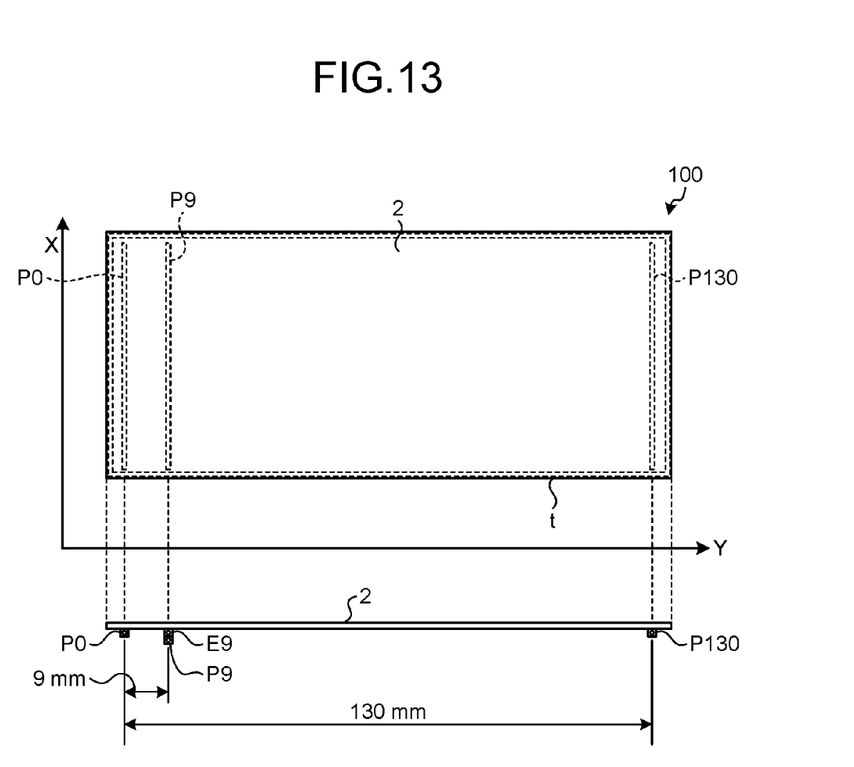
FIG. 13 is a diagram illustrating a fourth arrangement example of piezoelectric elements in the terminal device according to the embodiment.

Fourth Arrangement Example of Piezoelectric Elements in Terminal Device According to Embodiment FIG. 13 is a diagram illustrating a fourth arrangement example of piezoelectric elements in the terminal device according to the embodiment. In description of the fourth arrangement example of piezoelectric elements, only a different part from the first arrangement example of piezoelectric elements is described. As illustrated in FIG. 13, the terminal device 100 includes a pressurization piezoelectric element P9 instead of the pressurization piezoelectric element P121 illustrated in FIG. 2. The pressurization piezoelectric element P9 is a long element that is attached to the back surface of the touch panel 2 along the X-axis direction so as to be approximately parallel to the excitation piezoelectric elements P0 and P130 on the inner side of the touch panel 2 in the Y-axis direction than the excitation piezoelectric elements P0 and P130.

The pressurization piezoelectric element P9 is attached to the back surface of the touch panel 2 by an attaching member such as double-sided adhesive tape through an elastic body E9 inserted between the pressurization piezoelectric element P9 and the touch panel 2. When the Y-coordinate of the excitation piezoelectric element P0 attached to the touch panel 2 is set as 0, the pressurization piezoelectric element P9 is attached to the position of the touch panel 2 where is at a distance of, for example, 9 mm from the excitation piezoelectric element P0 in the direction of the Y-coordinate. Furthermore, the pressurization piezoelectric element P9 is arranged in an area corresponding to a non-node part of the fundamental vibration in the Y-axis direction. The pressurization piezoelectric element P9 generates predetermined pressurization or vibration that gives the pressurization in the touch panel 2 with applied voltage, thereby changing the vibration mode of the fundamental vibration generated by the excitation piezoelectric elements P0 and P130. Incidentally, a piezoelectric-element control process using the pressurization piezoelectric element P9 is the same as the piezoelectric-element control process using the pressurization piezoelectric element P121.

Fourth Controlled Vibration of Touch Panel According to Embodiment

Figure 14:
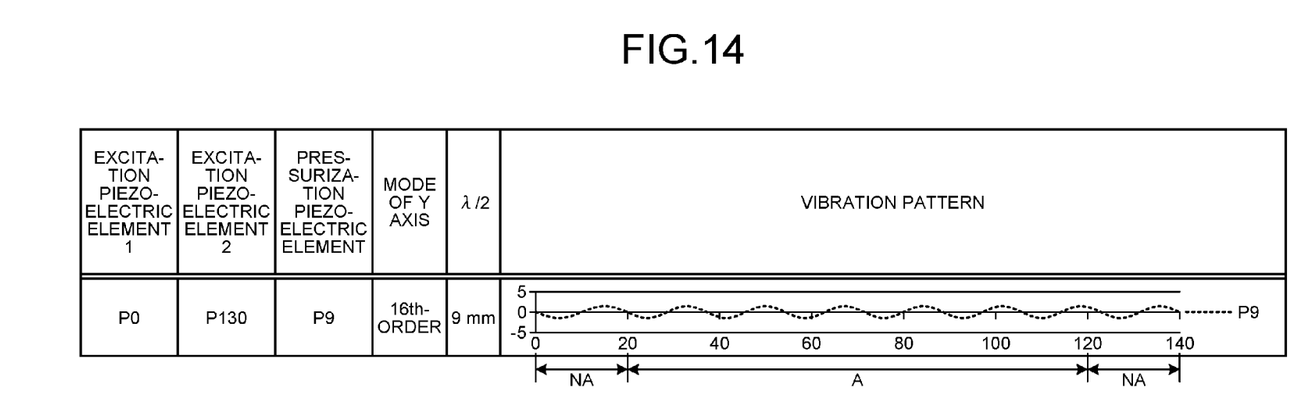
FIG. 14 is a diagram illustrating an example of fourth controlled vibration of the touch panel in the terminal device according to the embodiment.

FIG. 14 is a diagram illustrating an example of fourth controlled vibration of the touch panel in the terminal device according to the embodiment. The fourth controlled vibration is standing-wave vibration when the touch panel 2 is provided with the excitation piezoelectric elements P0 and P130 and the pressurization piezoelectric element P9. As illustrated in FIG. 14, the vibration pattern of the fourth controlled vibration is sixteenth-order vibration in the Y-axis direction of the touch panel 2. Furthermore, when the wavelength of the fourth controlled vibration is denoted by λ, λ/2 is about 9 mm. Like this, the fourth controlled vibration has a different length between adjacent nodes from the length between adjacent nodes of the fundamental vibration, so antinodes appear at the different position from those in the fundamental vibration.

Multiple Controlled Vibrations of Touch Panel According to Embodiment

Figure 15:
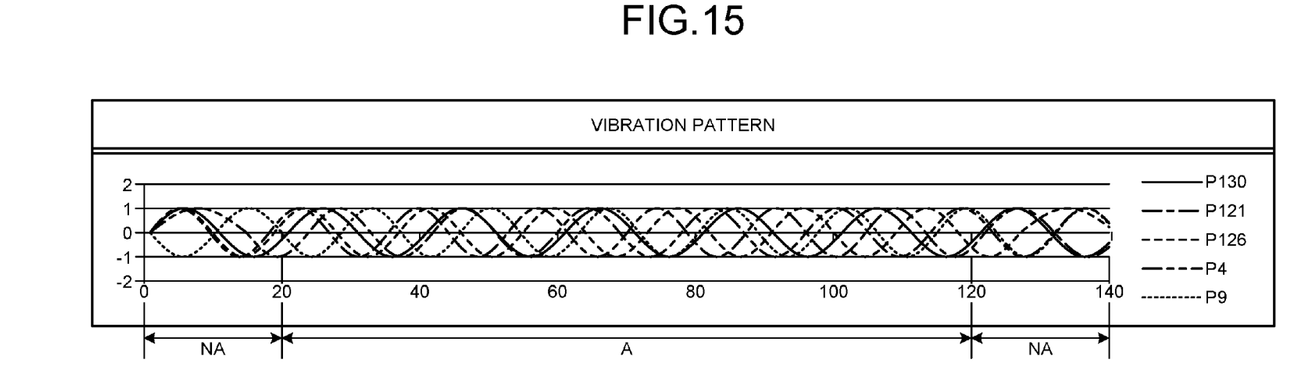
FIG. 15 is a diagram illustrating a list of the multiple vibrations of the touch panel in the terminal device according to the embodiment.

FIG. 15 is a diagram illustrating a list of the multiple controlled vibrations of the touch panel in the terminal device according to the embodiment. That is, FIG. 15 is a diagram illustrating a list of the respective controlled vibrations illustrated in FIGS. 5, 6, 10, 12, and 14. The touch panel 2 may be provided with a combination of multiple pressurization piezoelectric elements appropriately selected from the pressurization piezoelectric elements P121, P126, P4, and P9. That is, in the piezoelectric-element control process illustrated in FIG. 4, instead of Step S19, the terminal device 100 selects controlled vibration bringing an antinode closest to the touch position of the finger in those generated by the multiple pressurization piezoelectric elements (Step S19a). Then, in the piezoelectric-element control process illustrated in FIG. 4, instead of Step S20, the terminal device 100 may be configured to control a pressurization piezoelectric element that generates the controlled vibration selected at Step S19a and cause the pressurization piezoelectric element to generate the controlled vibration on the touch panel 2 (Step S20a).

In the above embodiment, a pressurization piezoelectric element is statically or dynamically driven according to the touch position of the finger. For example, according to the embodiment, when the touch position of the finger on the touch panel 2 having fundamental vibration is located near a node of the fundamental vibration, the support condition of the touch panel 2 is changed by driving the pressurization piezoelectric element. As a result, the embodiment may change the vibration mode of the touch panel 2. That is, while keeping the drive frequency of the excitation piezoelectric elements P0 and P130 unchanged at about 30 KHz, the embodiment achieves a change in the vibration mode of the touch panel 2 just by changing a support boundary condition of the touch panel 2. That is, according to the embodiment, even when the finger has touched near the position of a node of standing-wave vibration generated in the touch panel 2, the pressurization piezoelectric element pressurizes the touch panel 2, thereby changing the vibration mode of the touch panel 2, so the amplitude at the touch position is changed. Accordingly, a user obtains an approximately greatest tactile sensation when the user has touched any point of the touch panel 2.

In the above embodiment, the pressurization piezoelectric elements P121, P126, P4, and P9 are attached to the bottoms of the elastic bodies E121, E126, E4, and E9 that are in direct contact with the touch panel 2 so that the pressurization piezoelectric elements P121, P126, P4, and P9 give pressurization to the elastic bodies E121, E126, E4, and E9, respectively. Therefore, the stretching amount of the pressurization piezoelectric element that pressurizes the touch panel 2 in an out-of-plane direction is adjusted by appropriately setting physical properties of the elastic body, such as an elastic modulus of the elastic body, thus the vibration mode of standing-wave vibration of the touch panel 2 is flexibly changed. That is, the amount of amplitude at the user's touch position on the touch panel 2 is controlled flexibly.

[b] Other Embodiments (1) About Attachment of Pressurization Piezoelectric Element In the above embodiment, the pressurization piezoelectric element is attached to the bottom of the elastic body that is in direct contact with the touch panel so that the pressurization piezoelectric element gives pressurization to the elastic body. However, the technology discussed herein is not limited to this; alternatively, the pressurization piezoelectric element may be directly attached to the touch panel with no elastic body provided.

(2) About Drive Frequency of Pressurization Piezoelectric Element

In the above embodiment, the excitation piezoelectric elements and the pressurization piezoelectric element have the same drive frequency of, for example, 30 KHz. However, the technology discussed herein is not limited to this; when the touch panel on which standing-wave vibration is generated is a high-hardness or high-density glass panel or the like, the pressurization piezoelectric element may be driven at a higher frequency than that of the excitation piezoelectric elements, for example, a high frequency of 100 KHz. The appropriate vibration mode is obtained by driving the pressurization piezoelectric element at a higher frequency than that of the excitation piezoelectric elements.

(3) About Placement Position of Pressurization Piezoelectric Element

The pressurization piezoelectric elements P121, P126, P4, and P9 described in the above embodiment are just an example to illustrate the placement position of a pressurization piezoelectric element. That is, the placement position of a pressurization piezoelectric element and the number of pressurization piezoelectric elements may be changed accordingly in order to obtain intended controlled vibration.

(4) About Arrangement of Excitation Piezoelectric Elements

The excitation piezoelectric elements P0 and P130 described in the above embodiment are just an example to illustrate the placement positions of excitation piezoelectric elements. That is, the placement positions of excitation piezoelectric elements and the number of the excitation piezoelectric elements may be changed accordingly in order to obtain intended fundamental vibration.

Components of each apparatus described in the above embodiment do not always have to be physically configured as illustrated in the drawings. That is, the specific forms of division and integration of the components of each apparatus are not limited to those illustrated in the drawings; all or some of the components may be configured to be functionally or physically divided or integrated in arbitrary units according to various loads, usage conditions, etc.

Furthermore, all or any part of processing functions implemented in the apparatus may be implemented on a central processing unit (CPU). Moreover, all or any part of the processing functions implemented in the apparatus may be implemented on a microcomputer, such as an MPU, an MCU, an ASIC, or an FPGA. The MPU here is a micro processing unit; the MCU is a micro controller unit; the ASIC is an application specific integrated circuit; the FPGA is a field-programmable gate array. Furthermore, all or any part of the processing functions may be implemented on a program analyzed and executed by the CPU (or the microcomputer such as an MPU or an MCU) or on hardware by wired logic.

As an aspect, it is possible to reduce the variation in user's tactile sensation according to the touch position on a touch panel.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A tactile-sensation transmitting device comprising:
   a touch panel;
   a pair of first actuators that are separately attached to the touch panel, and generate standing-wave vibration in the touch panel to transmit a tactile sensation from a touch position on the touch panel; and
   a second actuator that is attached to the touch panel between the pair of first actuators, and pressurizes the touch panel thereby changing a position of an antinode of the standing-wave vibration.

2. The tactile-sensation transmitting device according to claim 1, wherein
   the second actuator is attached to the touch panel through an elastic member inserted between the second actuator and the touch panel.

3. The tactile-sensation transmitting device according to claim 1, wherein
   the second actuator pressurizes the touch panel so that the position of the antinode of the standing-wave vibration is brought closer to the touch position.

4. A terminal device comprising:
   a touch panel;
   a plurality of first actuators that are separately attached to the touch panel, and which generate standing-wave vibration in the touch panel to transmit a tactile sensation from a touch position on the touch panel;
   a plurality of second actuators that are attached to different positions on the touch panel between at least two of the plurality of first actuators, and pressurize the touch panel thereby changing a position of an antinode of the standing-wave vibration;
   a memory; and
   a processor coupled to the memory, the processor being configured to execute a process including:
      detecting a position of a touch operation made on the touch panel by a user;
      determining whether the detected position of the touch operation is within a predetermined distance from the position of the antinode of the standing-wave vibration; and
      selecting, when the determining unit has determined that the position of the touch operation is not within the predetermined distance from the position of the antinode of the standing-wave vibration, a second actuator selected from among the second actuators to control the selected second actuator to change the position of the antinode of the standing-wave vibration so that the position of the antinode of the standing-wave vibration is brought closest to the position of the touch operation.

5. A tactile-sensation transmitting method implemented by a terminal device, the tactile-sensation transmitting method comprising:
   detecting a position of a touch operation made on a touch panel by a user;
   determining whether the detected position of the touch operation is within a predetermined distance from a position of an antinode of standing-wave vibration generated in the touch panel by a plurality of first actuators that are separately attached to the touch panel to transmit a tactile sensation from a touch position on the touch panel; and
   selecting, when it has been determined that the position of the touch operation is not within the predetermined distance from the position of the antinode of the standing-wave vibration, a second actuator selected from a plurality of second actuators to control the selected second actuator to change the position of the antinode of the standing-wave vibration so that the position of the antinode of the standing-wave vibration is brought closest to the position of the touch operation, the second actuators being attached to different positions on the touch panel between at least two of the plurality of first actuators and pressurizing the touch panel.

* * * * *